United States Patent
Andresen et al.

(10) Patent No.: US 7,437,144 B1
(45) Date of Patent: Oct. 14, 2008

(54) METHOD OF MANAGING PREPAID SUBSCRIPTION INFORMATION

(75) Inventors: Lars L. Andresen, Hellerup (DK); Lone B. Fjordstrom, Birkerod (DK); Nikolaj Sloth, Vejle (DK); Jesper Bekkevold, Copenhagen (DK); Pirjo Haakana, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/959,411

(22) PCT Filed: Mar. 2, 2000

(86) PCT No.: PCT/FI00/00165

§ 371 (c)(1),
(2), (4) Date: Feb. 6, 2002

(87) PCT Pub. No.: WO00/65820

PCT Pub. Date: Nov. 2, 2000

(30) Foreign Application Priority Data

Apr. 26, 1999 (FI) .................................. 990937

(51) Int. Cl.
*H04M 11/00* (2006.01)
(52) U.S. Cl. ............ 455/405; 455/407; 379/114.01; 379/114.09; 379/114.16; 379/114.2
(58) Field of Classification Search ............. 455/405, 455/406, 407, 114.19, 114.2, 114.01, 126, 455/408, 409, 414.1; 379/111, 112.01, 114.01, 379/114.03, 114.09, 114.16, 114.17, 114.2, 379/144.01

See application file for complete search history.

(56) References Cited

U.S. PATENT DOCUMENTS

| 5,359,642 | A | | 10/1994 | Castro |
| 5,511,114 | A | * | 4/1996 | Stimson et al. ........ 379/114.16 |
| 5,677,945 | A | * | 10/1997 | Mullins et al. ......... 379/114.17 |
| 5,749,052 | A | * | 5/1998 | Hidem et al. ................ 455/406 |
| 5,777,305 | A | | 7/1998 | Smith et al. |
| 5,815,807 | A | * | 9/1998 | Osmani et al. .............. 455/410 |
| 5,818,915 | A | * | 10/1998 | Hayes et al. ................ 455/405 |
| 5,970,470 | A | * | 10/1999 | Walker et al. ................ 705/14 |
| 6,011,837 | A | * | 1/2000 | Malik ....................... 379/114.1 |
| 6,115,613 | A | * | 9/2000 | Jonsson ...................... 455/519 |
| 6,480,885 | B1 | * | 11/2002 | Olivier ....................... 709/207 |
| 6,542,601 | B1 | * | 4/2003 | Hernandez et al. ..... 379/265.01 |

(Continued)

FOREIGN PATENT DOCUMENTS

GB 2 262 685 6/1993

(Continued)

OTHER PUBLICATIONS

Certified copy of translation of Japanese Office Action, (Sep. 2, 2005).

*Primary Examiner*—Binh K Tieu
(74) *Attorney, Agent, or Firm*—Pillsbury Winthrop Shaw Pittman LLP

(57) ABSTRACT

A method, a telecommunications system and a network node are provided for managing subscription information of a prepaid subscription in a telecommunications system. According to the present invention, a first time limit indicating when the subscription will expire is set during subscription provisioning. When the first time limit is encountered, the subscription is deactivated.

27 Claims, 2 Drawing Sheets

U.S. PATENT DOCUMENTS 6,597,776 B1 * 7/2003 Walker et al. .......... 379/114.26
2002/0052754 A1 * 5/2002 Joyce et al. .................... 705/1

FOREIGN PATENT DOCUMENTS

| JP | 07-162958 | 6/1995 |
| JP | 09/312708 A | 12/1997 |
| JP | 11-068964 | 3/1999 |
| JP | 2000-032177 A | 1/2000 |
| WO | WO 95/28062 | 10/1995 |
| WO | 9601537 A1 | 1/1996 |
| WO | WO 96/24229 | 8/1996 |
| WO | WO 97/40616 | 10/1997 |
| WO | WO 98/20690 | 5/1998 |
| WO | WO 98/57488 | 12/1998 |
| WO | WO 99/04549 | 1/1999 |

* cited by examiner

METHOD OF MANAGING PREPAID SUBSCRIPTION INFORMATION

This is a National Stage Application of International Application PCT/FI00/00165 which was filed in the English language on Mar. 2, 2000 and designated the U.S.

BACKGROUND OF THE INVENTION

The present invention relates to a method and equipment for managing prepaid subscriber information. The prepaid subscription can be an individual subscription or a group subscription.

In telecommunications systems: such as the pan-European digital mobile communications system GSM (Global System for Mobile Communications), the use of prepaid SIM (Subscriber Identity Module) cards is increasing. Prepaid SIM cards relieve network service providers of credit losses. Furthermore, they enable parents to set an upper limit for the telephone bill beforehand. As a third benefit, they enable roaming subscribers to pay for their local calls at local tariffs, whereas using the SIM card of their home service provider results in paying international tariffs for connections to their home network and back.

Usually service providers allow the subscribers to call an Interactive Voice Response (IVR) service through which the service subscribers can check their account balance and add more money to their accounts. Some service provides also offer a web based interface, so that the subscribers can check their account balance and add more money to their accounts via the Internet. This adding of money is called recharging and it is done by means of vouchers or credit cards, for example. Some of the service providers sell different types of vouchers, which differ from each other for example in the number of 'call units'. In addition, each voucher has a voucher validity period, after which it cannot be used for recharging.

There are subscribers who do not use their prepaid SIM cards at all or who use only one prepaid SIM card and never recharge. A problem with the current prepaid solution is that once a prepaid subscription has been added to the system it will never be removed. This generates many problems for service providers running out of for example subscriber numbers, such as MSISDNs for mobile subscribers. Another problem with the current prepaid solution is that for example a subscriber with an originating prepaid subscription can continue to receive calls for years and years even though his account has already been used up. Thus the service provider will not get any payment from him.

DISCLOSURE OF THE INVENTION

The object of the invention is to overcome the above-stated problems. The object of the invention is achieved by a method, a system and a network element which are characterized by what is disclosed in the independent claims. The preferred embodiments of the invention are set forth in the dependent claims.

The invention is based on defining at least a subscription expiry time for the deactivation of the subscription. The time may be given as an exact date, or a timer may be set, for example.

The advantages of the invention are that the service provider finds easily those subscribers and groups who do not use the prepaid system anymore, and the service provider can define what should be done to them. For example, they could be removed from the databases including subscription information. In addition, the expiry of subscriptions allows the service provider to reuse MSISDN numbers. The unused and expired subscriptions are deactivated, whereafter the service provider can remove them from the system or reuse them with new subscribers or groups.

In an embodiment of the invention a user of the prepaid subscription receives an announcement before the subscription expires. A further advantage of this embodiment is that it is a simple way to remind the customer to recharge his account and thus keep the subscription active.

Yet in another embodiment of the invention the time limits, for example expiry dates, are updated when the subscription account is recharged. A further advantage of this embodiment is that the expiry depends on the use of prepaid services, and only those subscriptions which do not use prepaid services are deactivated.

In an embodiment of the invention, the prepaid subscription is a prepaid group subscription. An advantage of applying expiry times to a pre-paid group subscription is that all changes in a subscription affect all group members at the same time. For example when the subscription account is recharged, this affects all group members simultaneously in the same way.

BRIEF DESCRIPTION OF THE FIGURES

The invention will be described below in more detail by means of preferred embodiments with reference to the accompanying drawings, in which.

DETAILED DESCRIPTION OF THE INVENTION

Figure 1:
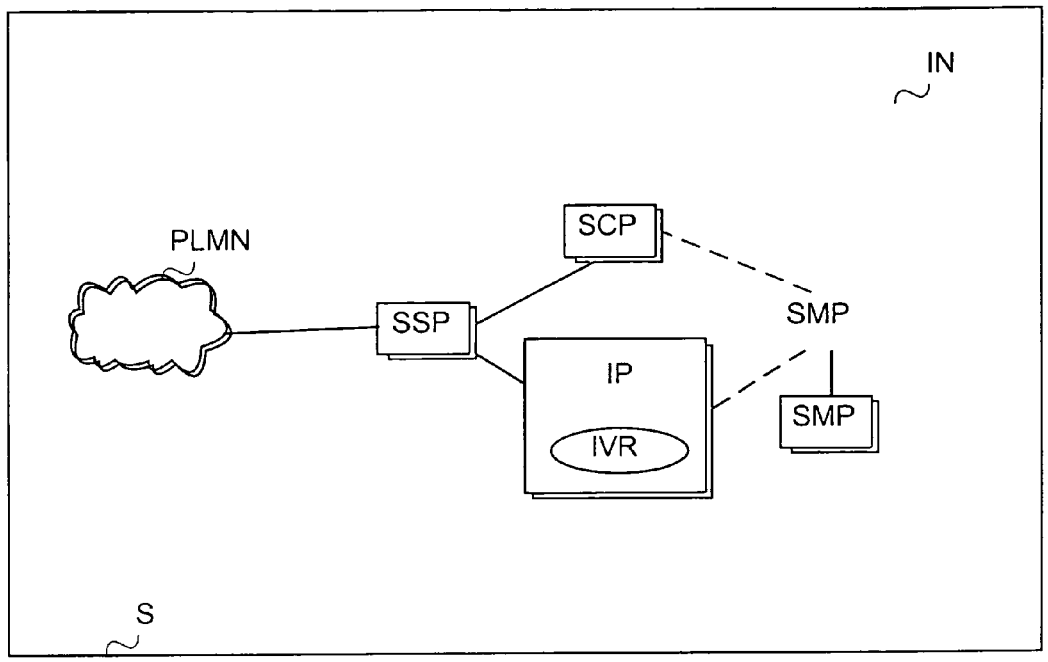
FIG. 1 is a block diagram showing some relevant network elements.

FIG. 1 is a block diagram of a telecommunications system S equipped with an arrangement according to a preferred embodiment of the invention. The telecommunications network is assumed to be a public land mobile network PLMN, however, the invention is not limited to this particular type of network. The invention can be used in any telecommunications systems where the prepaid subscribers or prepaid groups have subscription information stored in the system. A prepaid subscriber refers to a subscriber using prepaid subscription, i.e. a user of a prepaid subscription. A prepaid group refers to a group of one or more subscribers using one prepaid group subscription, i.e. users of a prepaid subscription sharing one common prepaid subscription account. Subscribers belonging to a group are also called members. The members of a group using a prepaid group subscription can be divided into different types. Preferably they are divided into two types: members who can recharge the subscription account (also called group account) and members who cannot recharge the subscription account. Below, a member who can recharge is called a supermember and a member who cannot recharge is called a submember. The member of a group can be a mobile subscriber, a fixed subscriber or a PBX (Private Branch Exchange) subscriber. Thus, a group subscription may include several different kind of subscribers. The group can also have one or more external parties who can recharge the group's subscription account. However, the external party is not a member of the group. The external party can be seen as an Internet-enabled group administrator. The external party can view all group information, recharge the group's subscription account and activate the subscription as described below. In other words, the external party is an Internet-enabled user with administrative means, not a member of the group (using a phone).

The embodiment illustrated in FIG. 1 makes use of Intelligent Network technology. An intelligent network IN is able to provide a subscriber of a telecommunications network, such as a wired network or a mobile telephone network, with a variety of services. An example of such an intelligent network is described in the recommendations of the ITU-T Q-1200 series, of which Q-1210 to Q-1219 define a set of features known as CS-1 (Capability Set 1), and correspondingly, 0-1220 to Q-1229 define a set of features CS-2. The invention and its background will be described by using the terminology of recommendation ETS 300 374-1 CoreINAP, but the invention can also be employed in intelligent networks implemented according to other intelligent network standards, for example CAMEL.

FIG. 1 shows some elements of an intelligent network which are relevant to the understanding of the invention, such as what are known as intelligent peripherals IP. Usually an IP is associated with a specialized resource function SRF, which is an interface for network mechanisms associated with interaction with a subscriber. Thus an IP may comprise more advanced speech handling functions than do exchanges in general. The IVR application is normally located in the IP. The IVR application, also called the PrePaid SIM IVR application, is an interactive voice response application that allows the subscriber to add money (deposit, recharge) to PrePaid SIM accounts by entering the number of a prepaid voucher. The IVR Voicetek Generation may be used as an execution environment for the IVR application.

The IP is connected to an SSP using for example ISUP (ISDN User Part) signalling and one or more voice transports. The SSP (Service Switching Point) is a network element performing a service switching function (SSF). The SSP may be a mobile services switching centre MSC, which includes the SSF. The SSF is an interface between a conventional call control function CCF and a service control function SCF of the intelligent network. The network element performing the SCF is called a service control point SCP. An intelligent network service is produced by the service switching point SSP inquiring instructions from the service control point SCP by means of messages to be transmitted across the SSP/SCP interface upon the encounter of detection points associated with the service. In association with an intelligent network service, a service program is started at the service control point SCP, the operation of the program determining the messages transmitted by the SCP to the SSP at each stage of a call. However, usually the SCP is not used in the service logic of the Prepaid SIM IVR recharge application, i.e. calls to the IVR are routed by the CCF directly to the IVR on the basis of the service number that the subscriber has dialed in order to recharge.

In this example illustrated in FIG. 1, prepaid subscriber-specific and group-specific information and information about vouchers are in a database located in a service management point SMP. Subscriber-specific information relates to an individual prepaid subscription and group-specific information relates to a prepaid group subscription. Alternatively the information may be located in different databases and/or in some other network element, such as a home location register HLR. The interface between the IVR and the SMP database is called a service management interface SMI. The SMP and the IP may be connected for example through a local area network (LAN) using the TCP/IP (Transmission Control Protocol/Internet Protocol). The connection between the IP and the SMP illustrated by a dashed line represents only a management connection without any signalling connection such as functions used to calculate the expiry time or times.

The service management access point SMAP provides selected users, such as service providers and network operators, with access to the service data of the service management point SMP through a public telephone network, such as the PSTN or the ISDN, a cellular radio network (such as the GSM) or a public data network (X.25, the Internet), and an open interface. The SMAP interacts directly with the SMP. Furthermore, the SMAP can provide access to a network element of another telecommunications network, such as the home location register HLR comprising data related to subscriber information and telecommunications services. Functionally, the SMAP comprises a service management access function.

Network operators and service providers are nowadays separated. A service provider buys the needed bearer services from a network operator. A network operator may also be a service provider. An operator may also have multiple service providers.

Subscriber-specific information and group-specific information according to the invention comprise at least some kind of indication of when the subscription will expire. Subscriber-specific information and group-specific information may also comprise information indicating when the credit expires. Subscriber-specific information and group-specific information may also comprise information indicating when the credit or the subscription is about to expire. Subscriber-specific information and group-specific information may also comprise information concerning how and where calls are routed in different situations, for example in different states described in FIG. 2. Subscriber-specific information and group-specific information may also comprise information indicating the state of the subscription. Group-specific information may also comprise information indicating services that members of the group can subscribe to. Group-specific information preferably does not comprise information about members of the group. However, group-specific information may comprise information indicating the supermembers and external parties who can recharge the subscription account.

The present invention can be implemented to the existing network elements. They all have processors and a memory with which the inventive functionality described below can be implemented. The functions described below may be located in one network element or some of them may be in one element and the others in other elements regardless of how they are located in the examples used to illustrate the invention.

Figure 2:
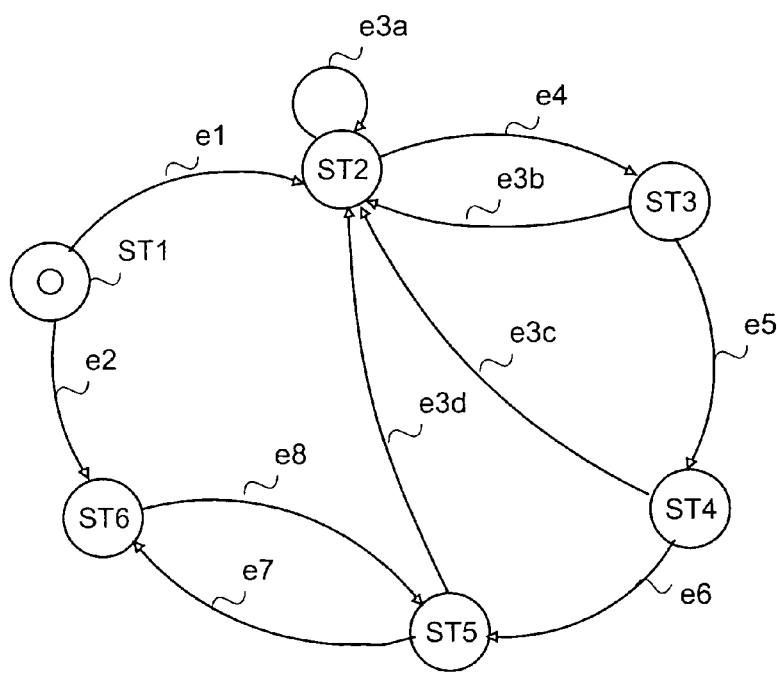
FIG. 2 shows a state machine of the first preferred embodiment of the invention.

FIG. 2 illustrates a state machine of the first preferred embodiment of the invention. Each state is described separately with the events that cause transition in and/or out of this state. For the sake of clarity it is assumed that the voucher or the credit card is valid. It is also assumed that the calls are re-routed to a corresponding IVR application. In other embodiments the service provider may also define some other number(s) to which the calls will be re-routed in different states. It is also assumed for the sake of clarity that the accounting is handled separately from timely management of the subscription. It is also assumed for the sake of clarity that the subscription is an individual prepaid subscription (i.e. one subscriber) and not a prepaid group subscription. A further assumption made here is that the subscriber does not use all his credit.

Referring to FIG. 2, the first state ST1 is called 'Preactive'. This state is entered as a result of prepaid subscription provisioning. In the first preferred embodiment an expiry date is set for the subscription during the prepaid subscription provisioning. In state ST1, no incoming calls can be received and any outgoing calls will be re-routed to the IVR application or to some other number defined by the service provider. This state ST1 is exited as a result of event e1 or event e2. Event e1 takes place when the subscriber makes a first outgoing call. Event e2 occurs when the subscription expires, for example the subscriber has not made a call before the expiry date of the subscription.

The second state ST2 is called 'Active'. This state is entered as a result of event e1, e3a, e3b, e3c or e3d. When the state is entered as a result of event e1, the prepaid subscription is initialized by a first call made by the subscriber. The call is re-routed to an IVR application relating to depositing and the subscription is activated. The following dates are calculated in the first preferred embodiment: near credit expiry date, credit expiry date, near subscription expiry date and subscription expiry date. The credit expiry date is calculated in the first preferred embodiment for example by adding the validity period of the credit to the date of this first call, and the other dates are calculated from the credit expiry date, since in the first preferred embodiment the expiry function determines the length of the periods between states ST2 and ST3, ST3 and ST4, ST4 and ST5, and ST5 and ST6. The length of the time periods may differ. The credit expiry date is calculated in order to encourage prepaid subscribers to recharge their accounts and thus generate more pre-paid traffic in the network and to produce more revenue to the service provider. The same dates are calculated (updated) with the same expiry function also when the state is entered as a result of a recharge event e3a, e3b, e3c or e3d in the first preferred embodiment.

In state ST2, the subscriber can make and receive calls. In other words all the services of the prepaid service are available to the subscriber (incoming and outgoing calls are allowed; outgoing calls are not re-routed to the IVR) in state ST2.

State ST2 is exited as a result of event e3a or event e4. Event e3a is a recharging event, which takes place whenever the subscriber wants (and manages) to add more money to his subscription account. During event e3a, state ST2 is exited and entered. This means that the subscription stays in the 'Active' state and the expiry dates and near expiry dates are recalculated. Event e4 occurs when the subscription has been in state ST2 so long (without recharging) that the near credit expiry date is encountered.

The third state ST3 is called 'Near credit expiry'. This state is entered as a result of event e4 described earlier. The purpose of this state is to urge the subscriber to recharge the subscription account. The subscriber with an originating prepaid subscription receives an announcement before every outgoing call with information of the date of credit expiry. The subscriber with a terminating prepaid subscription receives the same announcement right before he receives a call. If a subscription is both an originating and terminating prepaid subscription, the subscriber receives these announcements before every incoming and outgoing call. The remaining credit of the prepaid subscription may be reduced according to the deposit function defined in the voucher profile. State ST3 is exited as a result of event e3b or event e5. Event e3b occurs when the subscriber recharges his account. Event e5 takes place when the credit expiry date is encountered (according to the latest calculated date for credit expiry).

The fourth state ST4 is called 'Credit expired'. This state is entered as a result of event e5 described earlier. In state ST4, the remaining credit of the prepaid subscription may be reduced according to the deposit function defined in the voucher profile. The calls made by a subscriber with an originating subscription are re-routed to the IVR recharge application and the sub-scriber gets an announcement informing the subscriber of the credit expiry. It is still possible for the subscriber with an originating prepaid subscription to receive incoming calls. A subscriber with a terminating subscription cannot receive any incoming calls. Instead of an incoming call he receives an announcement informing the subscriber of the credit expiry. The subscriber with a terminating subscription can make calls. In some other embodiment of the invention he may also receive an announcement reminding him of the credit expiry also before each outgoing call. A subscriber with an originating and terminating subscription cannot make or receive calls, since all incoming calls are barred and outgoing calls are re-routed to the IVR recharge application. Therefore, in state ST4 those calls which are charged from the subscription account are barred.

State ST4 is exited as a result of event e3c or event e6. Event e3c occurs when the subscriber recharges his account. Event e6 takes place when the near subscription expiry date is encountered.

The fifth state ST5 is entered as a result of the above-described event e6 and event e8. Event e8 occurs when the service provider manually changes the state of the subscription from state ST6 to state ST5 and thus gives the subscriber an opportunity to recharge the account on the very same day in the first preferred embodiment. In some other embodiments the service provider can manually change the subscription expiry date at the same time when he is changing the state of the subscription. Yet in some other embodiments a new subscription expiry date may be calculated in response to event e8.

State ST5 is called 'Near Subscription expiry'. In this state the remaining credit of the prepaid subscription may be reduced according to the deposit function defined in the voucher profile, and incoming calls are barred to both originating and terminating prepaid subscriptions. An announcement informing the subscriber of the forthcoming expiry of the subscription is given. The announcement is given to a subscriber with originating prepaid subscription before each outgoing call and to a subscriber with terminating prepaid subscription instead of every incoming call. In both cases, every outgoing call is re-routed to the IVR recharge application.

This announcement is an extra incentive for the subscriber to recharge before the subscription is deactivated.

State ST5 is exited as a result of event e3d or event e7. Event e3d occurs when the subscriber recharges his account. Event e7 takes place when the subscription expiry date is encountered. In the first, preferred embodiment, if state ST5 has been entered as a result of event e8, the exit event e7 is encountered on the same calendar day the state was changed.

The sixth state ST6 is entered as a result of the above-described event e7 and event e2. Event e2 occurs if the subscriber has not activated his subscription, that is, he has not made a first call within a time limit given during the subscription, i.e. the subscription expiry date that was set when state ST1 was entered. The purpose of event e2 is to allow expiry of subscriptions which are not sold, for example the prepaid package solutions.

In state ST6, called 'Subscription expired', the subscription is deactivated. All calls are barred, i.e. the subscriber can neither receive incoming calls nor make outgoing calls regardless of subscription type outgoing, incoming, both). No announcements are played. Even calls to the IVR recharge application and the service provider hot line are barred. The subscriber is no longer able to use his subscription in any way. In this state the remaining credit of the prepaid subscription may be reduced according to the deposit function defined in the voucher profile. The service provider may remove subscriptions which are in state ST6 from the system for example by an automatic night job. This removal can be done if the subscription has been in state ST6 for four days, for example. Removing a subscription also means that the space of the removed subscription information is marked free (or indicated in some other way that the space can be overwritten) and the information cannot be used anymore.

In a prepaid group subscription the above states are same for all group members, the states are entered at the same time and all group members hear the announcements. In the first preferred embodiment the group is divided into supermembers and submembers. All group members are therefore not allowed to recharge the subscription account (i.e. group account), and the recharging events e3a, e3b, e3c and e3d can only take place if the recharging subscriber is either a supermember of the group or an external party. In the first preferred embodiment event e1 takes place if the subscriber, making the first call initializing the subscription, is a supermember of the group. In another embodiment of the invention where the group is also divided into supermembers and submembers, event e1 also takes place when a submember makes the first call. In embodiments where the group is not divided, each member of the group can be considered as supermember.

If a group has at least one external party, a first web use can initialize the subscription instead of the first call. The 'first web use' refers here to the first time the administrative means of the prepaid group subscription is used over the web. In the first preferred embodiment the one which is made first, initializes the subscription. In other words, event e1 takes place when an external party of the group activates the subscription over the web (before a first call is made). In embodiments where only the external party/parties can initialize the subscription, event e1 takes place only in response to the first web use. The external parties can recharge the account and/or inspect expiry dates etc. over the web. Service providers can also inform external parties about state changes and their impact on subscriptions with conventional means, letters, short messages, e-mail etc.

FIG. 2 illustrates only one example of a very generic state machine. It is possible to add more states or to remove states in some other embodiments. It is also possible to add or remove events. The state machine according to the invention should comprise at least states ST1, ST2 and ST6 with the appropriate events (e1, e2 and modified e7).

Figure 3:
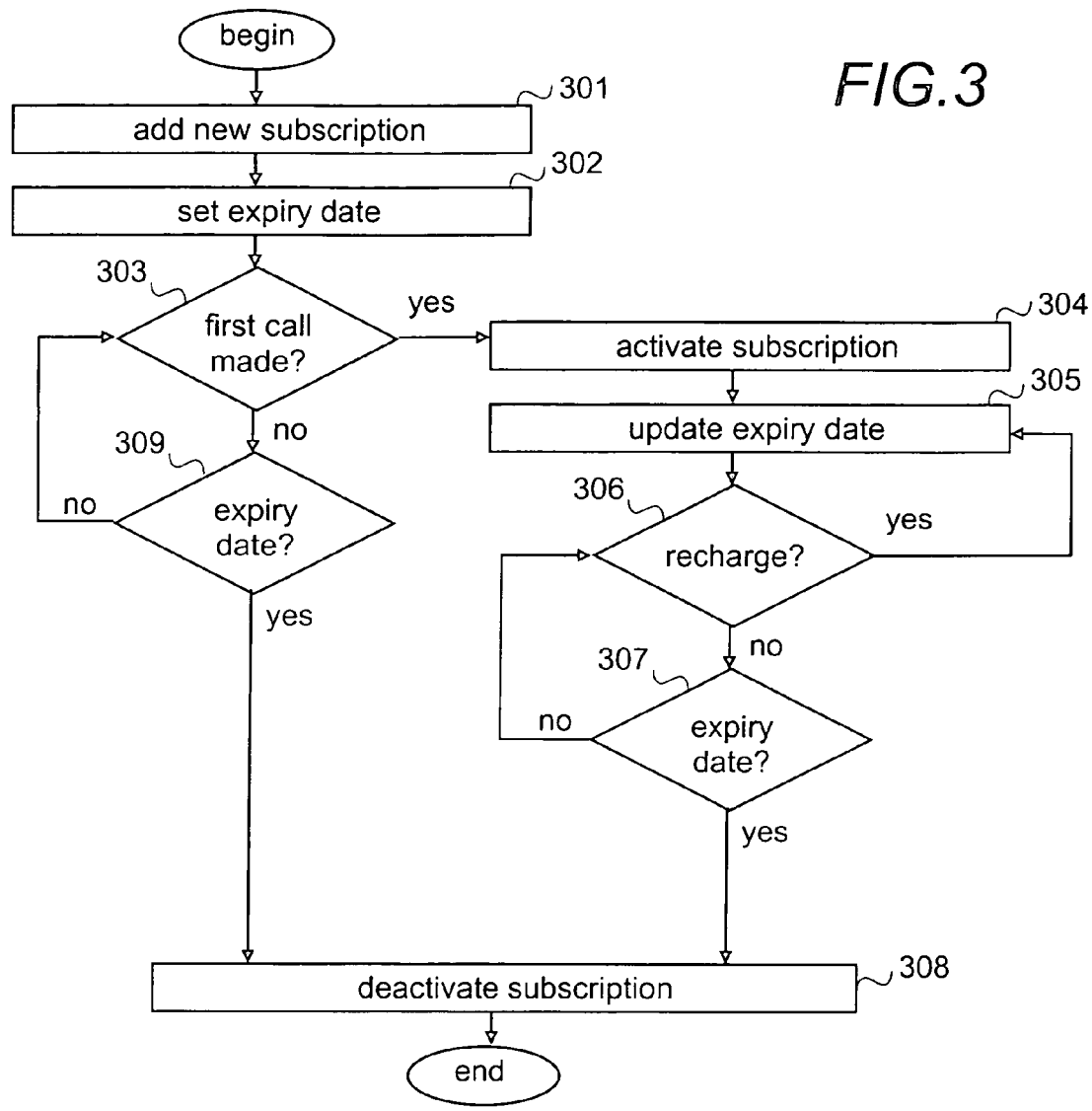
FIG. 3 is a flow chart illustrating the second preferred embodiment of the invention.

FIG. 3 is a flow chart illustrating the functionality of the SMP in the second preferred embodiment of the invention, where it is assumed for the sake of clarity that the accounting is handled separately and the vouchers are valid. It is also assumed for the sake of clarity that the subscription is an individual prepaid subscription (i.e. one subscriber) and not a prepaid group subscription. In the second embodiment, only the time limit to the subscription expiry, i.e. the subscription expiry date, is calculated.

Referring to FIG. 3, a new subscription is added in step 301 to the database of the service provider having subscriber-specific information. In step 302 a subscription expiry date is set. In the second preferred embodiment the subscription expiry date is set by the SMP (i.e. the network element maintaining subscriber-specific information). In the second preferred embodiment this subscription expiry date is a constant, the value of which is configurable. After the subscription is provisioned, it is monitored whether the subscriber makes a first call or not in step 303. If the subscriber makes the first call, the subscription is activated in step 304 and the subscription expiry date is updated in step 305. In the second preferred embodiment the new subscription expiry date is the result of adding together the validity period of the credit, such as 6 months, and the date of this first call. Although not shown in FIG. 3, credit is deposited on the account Now the subscriber can receive and make calls. Then it is monitored whether the subscriber performs recharging in step 306 or whether the subscription expiry date is encountered in step 307. If the subscriber recharges (step 306), the subscription expiry date is updated in step 305. From now on the process proceeds as described above. If the subscription expiry date is encountered (step 307), the subscription is deactivated in step 308 and the subscriber will not be able to use his subscription anymore. The same step 308 is also encountered when the subscription expiry date set in step 302 is encountered in step 309 before a first call of step 303.

The functionality of the SMP in the second preferred embodiment with a group subscription is almost the same as described above. The differences are described below. In a group prepaid subscription, instead of a new subscriber, a new group is added in step 301 to the subscriber database of the service provider. Information about the group, i.e. members of the group etc. is added to the subscriber database. After the subscription is provisioned, in step 303 it is monitored whether a subscriber belonging to the group makes a first call or not. In the second preferred embodiment it is assumed that the group has no external parties and all subscribers belonging to the group can make the first call activating the subscription. In embodiments where only supermembers of the group are allowed to make the first call, in step 303 it is monitored whether a supermember makes the first call. In embodiments where there is at least one external party who is allowed to activate the subscription, in step 303 it is monitored whether a first call is made by a subscriber who can activate the subscription or a first web use is made by an external party Whichever takes place first activates the subscription. In one embodiment of the invention where only external parties can activate the subscription in step 303 it is monitored whether a first web use is made. After step 305 all sub-scribers belonging to the group can receive and make calls. In step 306 it is monitored whether an external party of the group or a subscriber belonging to the group and having the right to recharge the subscription account, performs recharging. A recharging attempt made by a subscriber having no right to recharge, is ignored. In other words, the system does not accept the recharging attempt. If the subscription is deactivated (step 308), the subscribers belonging to the group will no longer be able to use the group subscription.

The steps have not been set out in an absolute time sequence in FIG. 3. Some of the above-described steps may take place simultaneously or in different order, for example. Some steps may also be skipped over, such as step 305 in embodiments where the service provider has set a fixed subscription expiry date. There may also be other steps not shown in FIG. 3 between the steps stated above.

Although the invention is described above assuming that the subscription is activated in response to the first call made by the subscriber, the invention may also be implemented in such prepaid systems where the subscription is activated during provisioning. In these systems the subscription expiry date is not calculated twice. The accompanying drawings and the related description are only intended to illustrate the present invention. Different variations and modifications of the invention will be apparent to those skilled in the art, without departing from the scope and spirit of the invention defined in the appended claims.

The invention claimed is:

1. A method comprising:
    setting, during subscription provisioning of a prepaid subscription of a telecommunications system, a first time limit indicating when the subscription will expire, the first time limit being a fixed period of time;
    encountering the first time limit; and
    deactivating the prepaid subscription of the telecommunications system in response to the encountered first time limit, a deactivation causing calls to and from the prepaid subscription to be barred.

2. A method comprising:
    setting, during subscription provisioning of a prepaid subscription of a telecommunications system, a first time limit indicating when the prepaid subscription of the telecommunications system will expire, the prepaid subscription being a prepaid group subscription having one common prepaid subscription account for all group members and the first time limit being a fixed period of time;
    encountering the first time limit; and
    deactivating the prepaid subscription of the telecommunications system in response to the encountered first time limit, a deactivation causing calls to and from the prepaid subscription to be barred.

3. A method as claimed in claim 1, the method further comprising updating the first time limit during subscription activation of the prepaid subscription of the telecommunications system.

4. A method as claimed in claim 1, the method further comprising:
    calculating, during subscription activation of the prepaid subscription of the telecommunications system, a second time limit preceding the first time limit by a predefined time period;
    encountering the second time limit; and
    giving, after encountering the second time limit, a user of the subscription an announcement saying that the prepaid subscription of the telecommunications system will expire soon.

5. A method as claimed in claim 1, the method further comprising:
    calculating, during subscription activation of the prepaid subscription of the telecommunications system, a third time limit indicating when the credit in the subscriber's account will expire;
    encountering the third time limit; and
    barring at least all calls which are charged from the prepaid subscription of the telecommunications system in response to the encountered third time limit.

6. A method as claimed in claim 5, the method further comprising:
    calculating, during subscription activation of the prepaid subscription of the telecommunications system, a fourth time limit preceding the third time limit by a predefined time period;
    encountering the fourth time limit; and
    giving, after encountering the fourth time limit, a user of the prepaid subscription of the telecommunications system an announcement saying that the credit will expire soon.

7. A method as claimed in claim 1, the method further comprising updating the time limit when the prepaid account of the prepaid subscription of the telecommunications system is recharged.

8. A method comprising:
    setting, during subscription activation of a prepaid subscription of a telecommunications system, a first time limit indicating when the credit will expire, the first time limit being a fixed period of time;
    encountering the first time limit;
    allowing recharging also within a predetermined time period after the first time limit has been encountered;
    updating the first time limit in response to the recharging; and
    deactivating the prepaid subscription of the telecommunications system if recharging has not been carried out within the predetermined time period after the first time limit has been encountered, a deactivation causing calls to and from the prepaid subscription to be barred.

9. A telecommunications system offering prepaid subscription services, the system comprising:
    at least one database having subscription information on at least one prepaid subscription of the telecommunications system
    at least one processor operatively connected to the at least one database and configured to set a first time limit for subscription information during subscription provisioning of a prepaid subscription of the telecommunications system, the time limit indicating when the subscription will expire and being a fixed period of time, and to deactivate the prepaid subscription of the telecommunications system in response to encountering the first time limit, a deactivation causing calls to and from the prepaid subscription to be barred.

10. A telecommunications system as claimed in claim 9, wherein the at least one processor is further configured to calculate, during subscription activation of the prepaid subscription of the telecommunications system, a second time limit indicating when the credit in the subscription account will expire, and to bar at least all calls for which the subscription is charged in response to encountering the second time limit.

11. A telecommunications system as claimed in claim 10, wherein
    the prepaid subscription of the telecommunications system is a group subscription, the group comprising at least one first member who is allowed to activate the group subscription and at least one second member who is not allowed to activate the group subscription; and
    the at least one processor is further configured to activate the group subscription and calculate the second time limit in response to the first subscriber activating the group subscription.

12. A telecommunications system as claimed in claim 9, wherein the at least one processor is further configured to update the time limit in response to the subscription account being recharged.

13. A telecommunications system as claimed in claim 12, wherein
    the prepaid subscription of the telecommunications system is a group subscription, the group comprising at least one third member who is allowed to recharge the subscription account and at least one fourth member who is not allowed to recharge the subscription account; and
    the at least one processor is further configured to update the time limit in response to the third subscriber recharging the subscription account.

14. A telecommunications system as claimed in claim 12, wherein
    the prepaid subscription of the telecommunications system is a group subscription having at least one external party who does not belong to the group but who is allowed to recharge the subscription account; and the at least one processor is further configured to update the time limit in response to the external party recharging the subscription account.

15. A network element comprising:

a database having subscription information on prepaid subscriptions of a telecommunications system;

means for monitoring a time limit indicating when a prepaid subscription of the telecommunications system will expire, the time limit being a fixed period of time; and means for deactivating the prepaid subscription of the telecommunications system in response to encountering the time limit, a deactivation causing calls to and from the prepaid subscription to be barred.

16. A network element as claimed in claim 15, wherein the network element further comprises means for setting the time limit during subscription provisioning of the prepaid telecommunications system.

17. A network element as claimed in claim 15, wherein the network element further comprise means for setting the time limit during subscription activation of the prepaid subscription of the telecommunications system.

18. A method as claimed in claim 8, the method further comprising barring calls to and from the prepaid subscription of the telecommunication system after the prepaid subscription of the telecommunications system has been deactivated.

19. A method comprising:

calculating by a telecommunications system, during subscription activation of a prepaid subscription of the telecommunications system, a first time limit indicating time when the prepaid subscription of the telecommunications system will expire, the first time limit being a fixed period of time;

monitoring the first time limit;

encountering the first time limit; and deactivating the prepaid subscription of the telecommunications system in response to the encountered first time limit whereafter calls to and from this prepaid subscription are barred by the system.

20. A method as claimed in claim 19, the method further comprising barring calls to and from the subscription after the subscription has been deactivated.

21. A method comprising:

calculating, during subscription activation of a prepaid subscription of a telecommunications system, a first time limit indicating time when the subscription will expire, the prepaid subscription of the telecommunications system being a prepaid group subscription having one common prepaid subscription account for all group members, and the first time limit being a fixed period of time;

monitoring the first time limit;

encountering the first time limit; and deactivating the prepaid subscription of the telecommunications system in response to the encountered first time limit where after calls to and from this prepaid subscription are barred by the system.

22. A method as claimed in claim 21, the method further comprising barring calls to and from the subscription after the subscription has been deactivated.

23. A telecommunications system offering prepaid subscription services, the system comprising:

at least one database having subscription information on at least one prepaid subscription of the telecommunications system; and at least one processor configured to calculate a first time limit for subscription information during subscription activation of the prepaid subscription of the telecommunications system, the time limit indicating time when the prepaid subscription of the telecommunications system will expire and being a fixed period of time, and to deactivate the prepaid subscription of the telecommunications system in response to encountering the first time limit, a deactivation causing calls to and from the prepaid subscription to be barred.

24. A system as claimed in claim 23, the at least one processor being configured to bar calls to and from the prepaid subscription of the telecommunications system after the subscription has been deactivated.

25. A network element comprising:

a processor configured to monitor a time limit indicating when a prepaid subscription of a telecommunications system will expire, said time limit being a fixed period of time, said processor being configured to deactivate the prepaid subscription of the telecommunications system in response to encountering the time limit, a deactivation causing calls to and from the prepaid subscription to be barred.

26. A network element as claimed in claim 25, wherein the processor is furthered configured to set the time limit in subscriber information during subscription provisioning of the prepaid subscription of the telecommunications system.

27. A network element as claimed in claim 25, wherein the processor is further configured to set the time limit in subscriber information during subscription activation of the prepaid subscription of the telecommunications system.

* * * * *